US006863088B2

United States Patent
Sugiura et al.

(10) Patent No.: US 6,863,088 B2
(45) Date of Patent: Mar. 8, 2005

(54) REPLACEABLE ORIFACE UNIT (75) Inventors: Toshimi Sugiura, Saitama (JP); Hiroki Igarashi, Saitama (JP); Takashi Imai, Saitama (JP)

(73) Assignee: Surpass Industry Co., Ltd, Saitama (JP)

( * ) Notice: Subject to any disclaimer, the term of this patent is extended or adjusted under 35 U.S.C. 154(b) by 0 days.

(21) Appl. No.: 10/375,113

(22) Filed: Feb. 28, 2003

(65) Prior Publication Data

US 2004/0168733 A1 Sep. 2, 2004

(51) Int. Cl.[7] .................................................. F15D 1/02
(52) U.S. Cl. ........................................ 138/44; 138/40
(58) Field of Search ............................ 138/44, 42, 40; 137/517

(56) References Cited

U.S. PATENT DOCUMENTS

| 2,687,147 A | * | 8/1954 | Feichter ........................ 138/44 |
| 3,582,048 A | * | 6/1971 | Sarem .......................... 366/340 |
| 3,822,592 A | * | 7/1974 | Siegel et al. ............... 73/861.61 |
| 3,894,562 A | * | 7/1975 | Moseley et al. ............... 138/44 |
| 3,958,603 A | * | 5/1976 | Bannon et al. ................ 138/43 |
| 4,232,711 A | * | 11/1980 | Ray et al. ...................... 138/44 |
| 4,334,554 A | * | 6/1982 | Geiger et al. .................. 138/44 |
| 4,625,780 A | * | 12/1986 | Burnham ..................... 141/319 |
| 4,653,291 A | * | 3/1987 | Moeller et al. ................ 62/511 |
| 4,762,150 A | * | 8/1988 | Kokuryu ....................... 138/44 |
| 4,800,925 A | * | 1/1989 | Yeoman ....................... 138/46 |
| 5,085,246 A | * | 2/1992 | Griinke ....................... 137/504 |
| 5,123,452 A | * | 6/1992 | LeBlanc ....................... 138/44 |
| 5,421,274 A | * | 6/1995 | Gordon et al. .............. 110/232 |
| 5,704,391 A | * | 1/1998 | McGowan et al. ....... 137/454.2 |
| 5,893,273 A | * | 4/1999 | Casiraghi ..................... 62/511 |
| 5,962,819 A | * | 10/1999 | Paulsson ..................... 181/102 |
| 6,024,129 A | * | 2/2000 | Schima ......................... 138/44 |

* cited by examiner

Primary Examiner—James Hook
(74) Attorney, Agent, or Firm—Browdy & Neimark, P.L.L.C.

(57) ABSTRACT

A replaceable orifice unit is disposed outside a pressure or a flow regulator valve, and therefore easy in maintenance, requires the smallest possible number of components, is compact in construction to save space, free from any fear that fluid impurities in a fluid circuit bank up against an upstream side of an orifice piece (2) of the unit, advantageous in replacing one type of chemicals flowing through the circuit with another type, and also advantageous in manufacturing cost. The replaceable orifice unit is constructed of a tube member (1), in which the orifice piece (2) assuming two symmetrically arranged similar triangular shapes in longitudinal cross section is fixedly mounted. Formed between vertexes of the triangle shapes is an orifice (2a). An O-ring is coaxially disposed between the tube member (1) and the orifice piece (2) to prevent the fluid from passing through therebetween.

14 Claims, 5 Drawing Sheets

REPLACEABLE ORIFACE UNIT

BACKGROUND OF THE INVENTION

1. Field of the Invention

The present invention relates to a replaceable orifice unit, and more particularly to a replaceable orifice unit for controlling the flow rate of a high purity chemical or any other fluid in a fluid circuit used in semiconductor fabrication process, for example, wherein the replaceable orifice unit is disposed outside a pressure or a flow regulator valve in the fluid circuit.

2. Description of the Related Art

Heretofore, it has been known in the art of semiconductor fabrication to use an orifice unit outside a pressure or a flow regulator valve in regulating the flow rate of a fluid in a fluid circuit, and also known to use a pressure or a flow regulator valve in which the orifice unit is incorporated. The orifice unit thus incorporated in the regulator valve is hereinafter referred to as "incorporated-type orifice unit.

Essentially, the pressure or the flow regulator valve functions to keep constant both the fluid pressure and the flow rate of the fluid in a downstream side of the pressure or the flow regulator valve, independent of variations of the fluid in both fluid pressure and flow rate in an upstream side of the pressure or the flow regulator valve in the fluid circuit. Further, it is known in the art to stabilize the flow rate of the fluid in the downstream side of the pressure or the flow regulator valve by imposing a suitable load on the downstream side of the pressure or the flow regulator valve, wherein the load is realized in the form of either a fixed orifice unit or an adjustable orifice unit an orifice of which is adjustably sized using a needle member.

In controlling the flow rate of a fluid in a fluid circuit, it is also known to control the pressure or the flow regulator valve in the fluid circuit by using a thumbscrew of a main body of the regulator valve when the regulator valve is of a manually controlled type, and also known to control the pressure or the flow regulator valve in the fluid circuit by using a variable pilot pressure of the regulator valve when the regulator valve is of an air or pneumatically operated type. Furthermore, it is also known in the art to control the pressure or the flow regulator valve by changing a fixed orifice unit or by controlling a needle valve in the downstream side of the pressure or the flow regulator valve.

However, in the case of the needle valve, the flow rate of the fluid in the circuit having been once set by using the needle valve tends to vary and is therefore poor instability or reliability. Due to this, the fixed orifice unit is widely used in the art as a load imposed on the downstream side of the pressure or the flow regulator valve in the fluid circuit. In using the fixed orifice unit in the downstream side of the pressure or the flow regulator valve in the fluid circuit, as described above, there are two possible cases. Namely, in one of these possible cases, the fixed orifice unit is incorporated in the main body of the pressure or the flow regulator valve. This satisfies less space requirement in the fluid circuit. On the other hand, in the other possible case, in order to simplify the pressure or the flow regulator valve in maintenance service in the fluid circuit, the fixed orifice unit may be of a replaceable type disposed outside the pressure or the flow regulator valve in the fluid circuit.

In using the fixed orifice unit, it is possible for the pressure or the flow regulator valve to satisfy the less space requirement in the fluid circuit by having the fixed orifice unit incorporated in the pressure regulator valve when the flow rate of the fluid in the fluid circuit is previously determined. This, however, makes it difficult for the pressure or the flow regulator valve to meet various requirements in performance when the fluid circuit is changed in design. Further, in doing maintenance service on the pressure or the flow regulator valve in the fluid circuit, it is necessary to dismount the pressure of the flow regulator valve from the fluid circuit. Further, in order to do maintenance service on the fixed orifice unit thus incorporated in the pressure or the flow regulator valve, it is necessary to disassemble the entire pressure or the entire flow regulator valve. Due to this, maintenance on the fixed orifice unit thus incorporated in the regulator valve is very cumbersome and time-consuming labor service.

Figure 4:
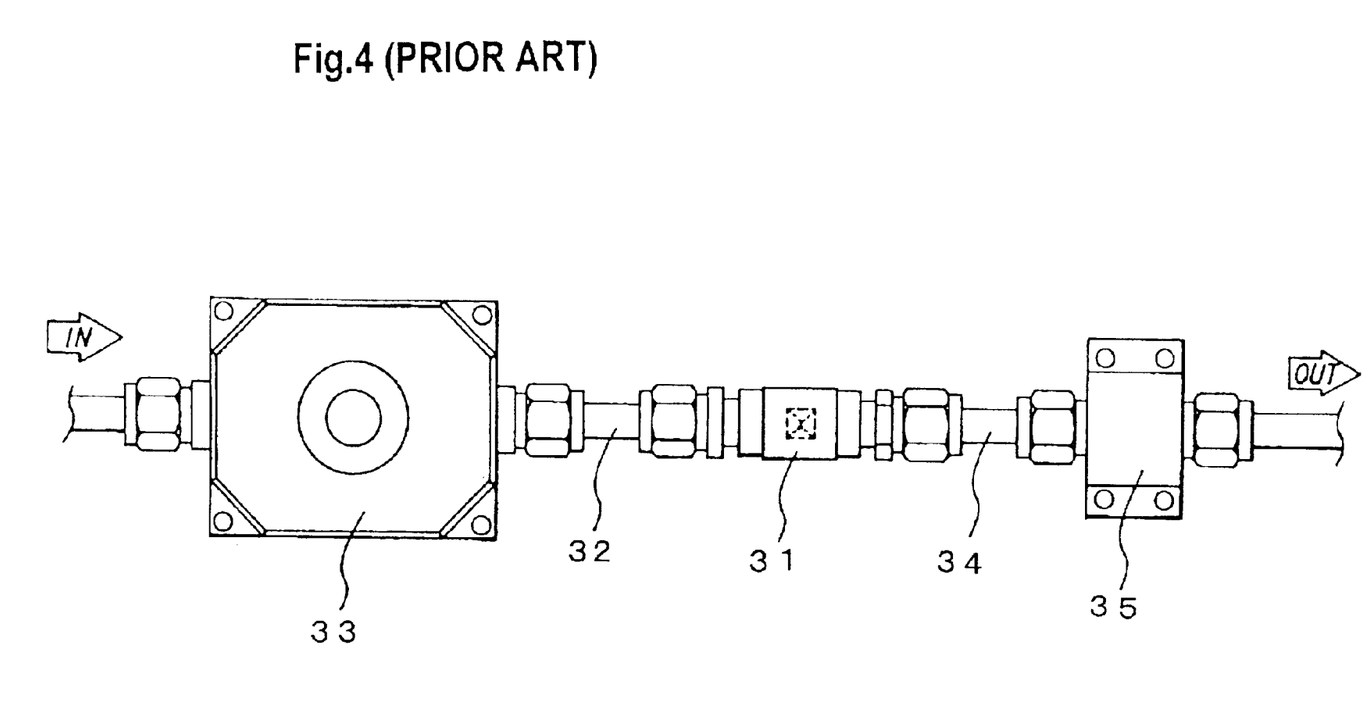
FIG. 4 is a side view of a replaceable orifice unit of a conventional type mounted in the fluid circuit.

As for a replaceable orifice unit, it is possible to simplify maintenance service on such a replaceable orifice unit. However, the replaceable orifice unit is relatively large in size. This makes it difficult to down-size a fluid circuit which employs the replaceable orifice unit as one of its component. More specifically, FIG. 4 shows a replaceable orifice unit 31 of a conventional type assuming a block-like shape. As is clear from FIG. 4, the conventional replaceable orifice unit 31 has an upstream side and a downstream side. In the upstream side of the conventional replaceable orifice unit 31, there is provided an upstream connecting tube unit 32 having its opposite end portions fixedly connected with a pair of an upstream and a downstream coupling unit. Through the upstream coupling unit, the upstream connecting tube unit 32 is fluid-communicated with the pressure or the flow regulator valve 33. Further, in the downstream side of the replaceable orifice unit 31, as is clear from FIG. 4, there is provided a downstream connecting tube unit 34 having its opposite end portions fixedly connected with a pair of an upstream and a downstream coupling unit. Through the downstream coupling unit, the downstream connecting tube unit 34 is fluid-communicated with an air or pneumatically operated valve 35. Since the conventional replaceable orifice unit 31 has the above construction, the conventional replaceable orifice unit 31 is too bulky as a whole in the fluid circuit.

Further, since any type of orifice units is bought into contact with a chemical flowing through the fluid circuit in operation, it is necessary for any type of the orifice units to have its inner wall lined with a specialized and therefore expensive chemical-resistance substance. This increases the manufacturing cost of the fluid circuit employing any type of the orifice units.

Consequently, a need exists in the art for entire replacement of the orifice unit in the fluid circuit. As for the orifice unit of a replaceable type, it is possible to do maintenance service on the replaceable orifice unit in an easy manner by simply replacing the connecting tube units 32, 34 of the opposite ends of the replaceable orifice unit 31 together with the replaceable orifice unit 31 itself with a set of new connecting tube units 32m 34 and a new replaceable orifice unit 31. However, this forces a user to keep ready on hand a plurality of extra sets of both the connecting tube units 32, 34 and the replaceable orifice units 31, and is therefore disadvantageous from an economical point of view. In view of this economical disadvantage, in ordinary maintenance service of the replaceable orifice unit 31 of a conventional type, only an orifice plate 36 (shown in FIG. 6) of the conventional replaceable orifice unit 31 is replaced with a new one 36 in the art.

Figure 5:
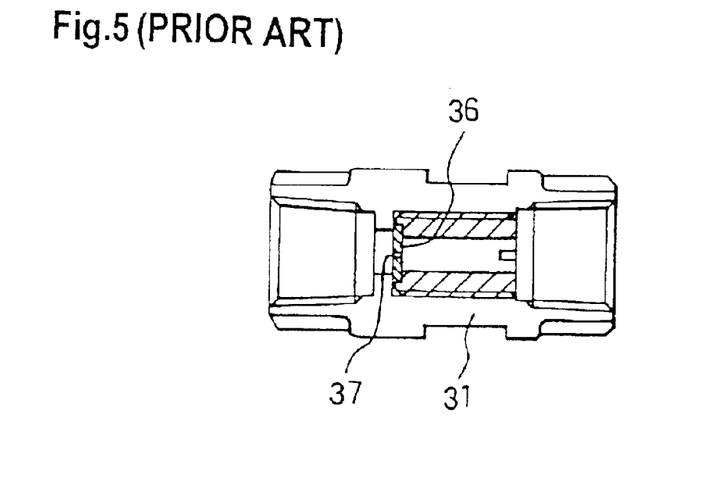
FIG. 5 is a longitudinal sectional view of the conventional replaceable orifice unit.
Figure 6:
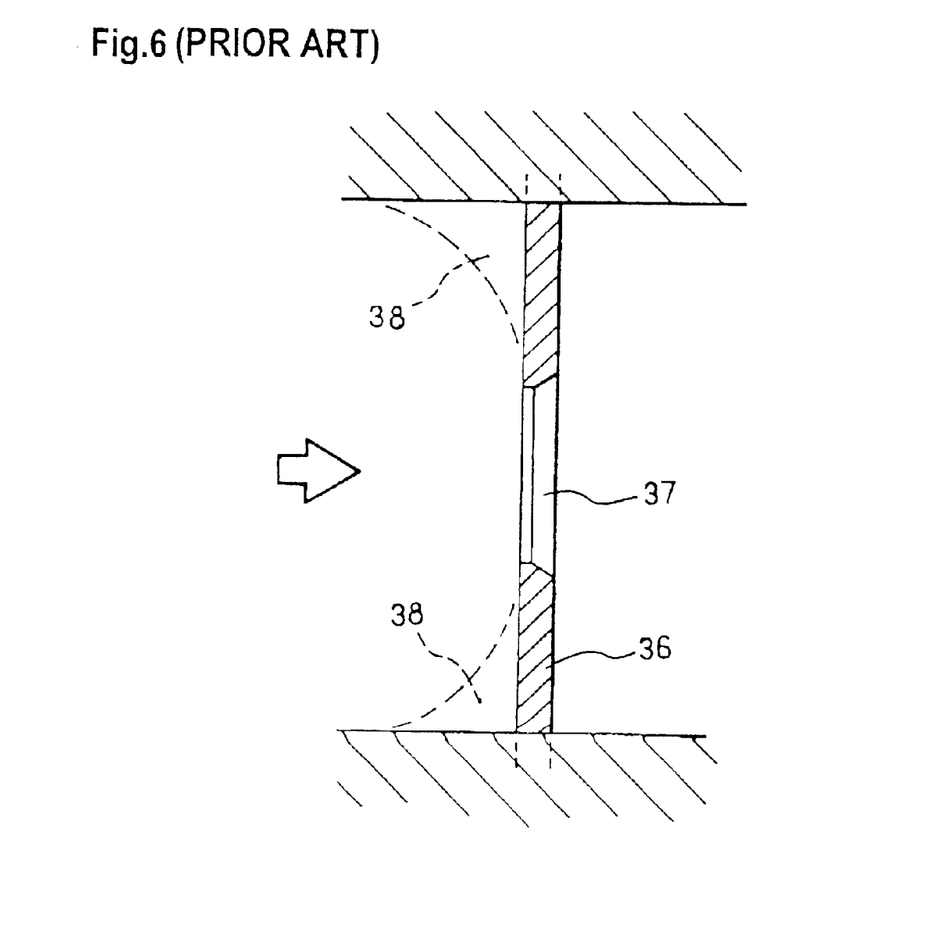
FIG. 6 is a longitudinal sectional view of an essential part of the conventional replaceable orifice unit, illustrating the deposition problem of fluid impurities inherent in the conventional orifice unit.

Further, in the conventional orifice unit of either a replaceable type 31 or an incorporated type, as shown in FIGS. 5 and 6, the orifice plate 36 having its orifice 37 reduced in diameter extends in a direction perpendicular to a flow direction of the fluid in the fluid circuit. Due to this, in the conventional orifice unit 31, as is clear from FIG. 6, there is a fear that impurities 38 of the fluid, for example, such as dust, debris and like impurities 38 bank up against the upstream side of the orifice plate 36 inside an inner wall of the conventional orifice unit 31. The impurities 38 thus deposited on the inner wall of the conventional orifice unit 31 adjacent to the upstream side of the orifice plate 36 tend to significantly impair the conventional orifice unit 31 in performance in the fluid circuit.

SUMMARY OF THE INVENTION

Under such circumstances, the present invention was made to solve the deposition problem of fluid impurities in a fluid circuit, wherein the fluid impurities tend to bank up against an upstream side of an orifice plate of a conventional replaceable orifice unit.

Consequently, it is an object of the present invention to provide a replaceable orifice unit, which: is disposed outside a pressure or a flow regulator valve, and easy in maintenance service; requires the smallest possible number of components; is compact in construction to make it possible to save space, free from any fear that the fluid impurities in the fluid circuit bank up against the upstream side of the orifice plate of the replaceable orifice unit, advantageous in replacing one type of chemicals flowing through the fluid circuit with another type of chemicals in the same circuit, and also advantageous in manufacturing cost.

The above object of the present invention is accomplished by providing:

A replaceable orifice unit constructed of a tube member, wherein an orifice piece is fixedly mounted inside the tube member; and, each of opposite end portions of the tube member has a coupling construction.

In the replaceable orifice unit having the above construction, preferably the orifice piece assumes two similar triangular shapes in longitudinal cross section symmetrically arranged with each other about a longitudinal axis of the tube member disposed therebetween in a condition in which each of the triangular shapes has its vertex oppositely disposed from each other to form an orifice therebetween in a central area of the cross section of the tube member, through which orifice a fluid in a fluid circuit passes.

Further, preferably a ring member is fitted inside each of opposite end portions of the tube member; and, an outer peripheral surface of each of the opposite end portions of the tube member is engaged with an inner peripheral surface of a reduced-diameter portion of a nut member coaxially disposed outside each of the opposite end portions of the tube member.

Still further, preferably an O-ring is interposed between an inner peripheral wall of the tube member and an outer peripheral surface of the orifice piece to prevent the fluid of the fluid circuit from passing through between the inner peripheral wall of the tube member and the outer peripheral surface of the orifice piece.

Further, preferably an inner peripheral wall of the tube member is welded to an outer peripheral surface of the orifice piece to provide an annular welded area capable of preventing the fluid of the fluid circuit from passing through between the inner peripheral wall of the tube member and the outer peripheral surface of the orifice piece.

Further, preferably the orifice piece is firmly clamped through the tube member by fastening a U-shaped clip member disposed outside the tube member to prevent the orifice piece from moving inside the tube member.

Further, preferably a sleeve-like spacer member is inserted inside the tube member to prevent the orifice piece from moving inside the tube member.

Still further, preferably at least one annular ridge portion is provided in an outer peripheral surface of the orifice piece to abut against an inner peripheral wall of the tube member.

Further, preferably the annular ridge portion is provided in the outer peripheral surface of the orifice piece; the inner peripheral wall of the tube member is welded to the outer peripheral surface of the orifice piece; whereby the fluid in the fluid circuit is prevented from passing through between the inner peripheral wall of the tube member and the outer peripheral surface of the orifice piece.

Still further, the annular ridge portion of the orifice piece is disposed adjacent to the welded area formed between the inner peripheral wall of the tube member and the outer peripheral surface of the orifice piece.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1A:
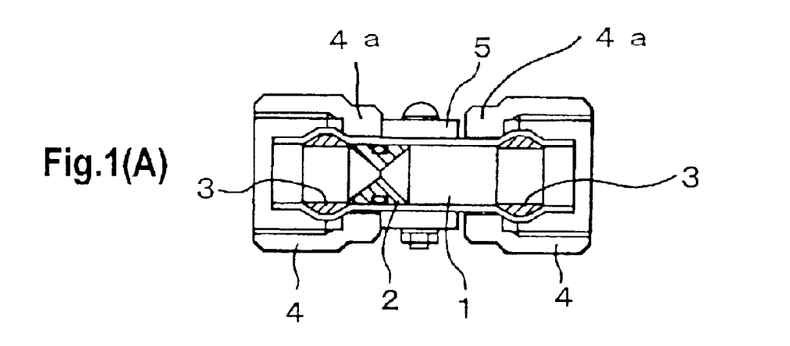
FIG. 1(A) is a longitudinal sectional view of a first embodiment of the replaceable orifice unit of the present invention.

As shown in FIG. 1(A), a first embodiment of a replaceable orifice unit of the present invention is constructed of a tube member 1. Each of opposite end portions of the tube member 1 has a coupling construction. Fixedly mounted inside the tube member 1 is an orifice piece 2. As is clear from FIGS. 1(B), 1(C), 1(D), the replaceable orifice unit of the present invention is capable of being modified in construction to provide various modifications of the first embodiment shown in FIG. 1(A).

In the first embodiment shown in FIG. 1(A), the tube member 1 in which the orifice piece 2 is incorporated has each of its opposite end portions receive there in a ring member 3. Under such circumstances, each of the opposite end portions of the tube member 1 is fitted in a nut member 4 in an insertion manner to have its outer peripheral surface brought into press-contact with an inner peripheral surface of a reduced-diameter portion 4a of the nut member 4 in a position adjacent to the ring member 3. In this first embodiment of FIG. 1(A), in order to prevent the orifice piece 2 from moving inside the tube member 1 relative to the tube member 1, the orifice piece 2 is firmly clamped from outside the tube member 1 by a U-shaped clip 5 of plastics through the tube member 1.

As is clear from this first embodiment shown in FIG. 1(A), the orifice pieces 2 assumes two similar triangular shapes in longitudinal cross section symmetrically arranged with each other about a longitudinal axis of the tube member 1 disposed therebetween in a condition in which each of the triangular shapes has its vertex oppositely disposed from each other to form an orifice 2a therebetween. Preferably, as is clear from FIG. 1(D), the orifice 2a of the ofifice piece 2 is provided in a central area of the cross section of the tube member 1, through which orifice 2a a fluid in a fluid circuit passes. In this case, the entire surface of an upstream side of the orifice piece 2 is inclined relative to a flow direction of the fluid in the circuit. Due to this inclination in the upstream surface of the orifice piece 2, there is no fear that impurities of the fluid such as dust and like impurities bank up against the upstream side of the orifice piece 2 in the first embodiment shown in FIGS. 1(A) and in its modifications shown in 1(B), 1(C) and 1(D).

Figure 1B:
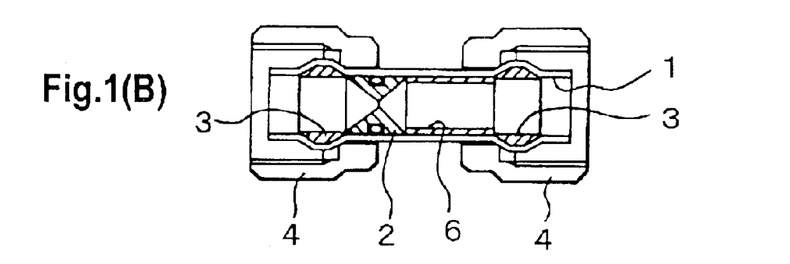
FIG. 1(B) is a longitudinal sectional view of the first embodiment of the replaceable orifice unit of the present invention, illustrating a first modification of the first embodiment shown in FIG. 1(A)

FIG. 1(B) shows a first modification of the first embodiment. In this first modification, a sleeve-like spacer member 6 is employed in place of the U-shaped clip 5 shown in FIG. 1(A). As is clear from FIG. 1(B), the sleeve-like spacer member 6 functions to prevent the orifice piece 2 from moving inside the tube member 1, as is in the case of the U-shaped clip 5.

Figure 1C:
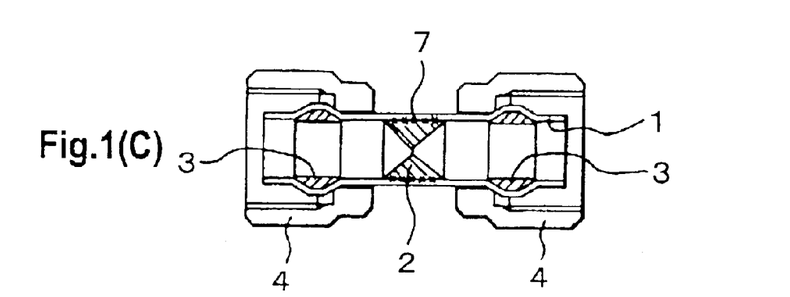
FIG. 1(C) is a longitudinal sectional view of the first embodiment of the replaceable orifice unit of the present invention, illustrating a second modification of the first embodiment shown in FIG. 1(A)

In each of the first embodiment and its first modification both described in the above, an O-ring is fitted inside the tube member 1 between an outer peripheral surface of the orifice piece 2 and an inner peripheral surface of the tube member 1 to prevent the fluid from passing through therebetween. It is possible to replace the O-ring with any other suitable sealing means. For example, as shown in FIG. 1(C) illustrating a second modification of the first embodiment, the sealing means is realized by welding the outer peripheral surface of the orifice piece 2 to the inner peripheral surface of the tube member 1 to provide a welded area 7 therebetween. In the drawings, graphic marks "X" represent a welded area 7 formed between the outer peripheral surface of the orifice piece 2 and the inner peripheral surface of the tube member 1 thus welded together. In this second modification of FIG. 1(C), the welded area 7 functions as a sealing means to prevent the fluid from passing through between the outer peripheral surface of the orifice piece 2 and the inner peripheral surface of the tube member 1. The welded area 7 also functions as a stopper means to prevent the orifice piece 2 from moving inside the tube member 1.

In welding the orifice piece 2 to the tube member 1 to form the welded area 7 therebetween, it is possible to employ an ultrasonic welding machine and the like. When the tube member 1 is made of thermoplastic materials such as fluoroplastics, for example such as "PFA" (tetrafluoroethylene-perfluoroalkyl vinyl ether copolymer), it is possible to weld only a limited area of the inner peripheral surface of tube member 1 to the outer peripheral surface of the orifice piece 2 after completion of insertion of the orifice piece 2 into the tube member 1.

Figure 1D:
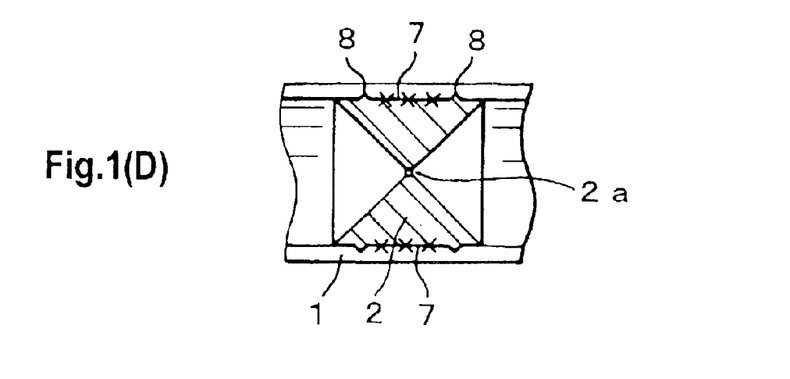
FIG. 1(D) is a longitudinal sectional view of the first embodiment of the replaceable orifice unit of the present invention, illustrating an essential part of a third modification of the first embodiment shown in FIG. 1.

FIG. 1(D) shows an essential part of a third modification of the first embodiment shown in FIG. 1. In this third modification, at least one annular ridge portion 8 is formed in the outer peripheral surface of the orifice piece 2. The annular ridge portion 8 of the orifice piece 2 is adapted to bite the inner peripheral surface of the tube member 1 in a fluid-tight manner. In FIG. 1(D), the marks "X" represent the welded area 7 formed between the outer peripheral surface of the orifice piece 2 and the inner peripheral surface of the tube member 1 thus welded together. The provision of the annular ridge portion 8 in the orifice piece 2 is capable of further improving the replaceable orifice unit of the present invention in fluid sealing properties.

Figure 2:
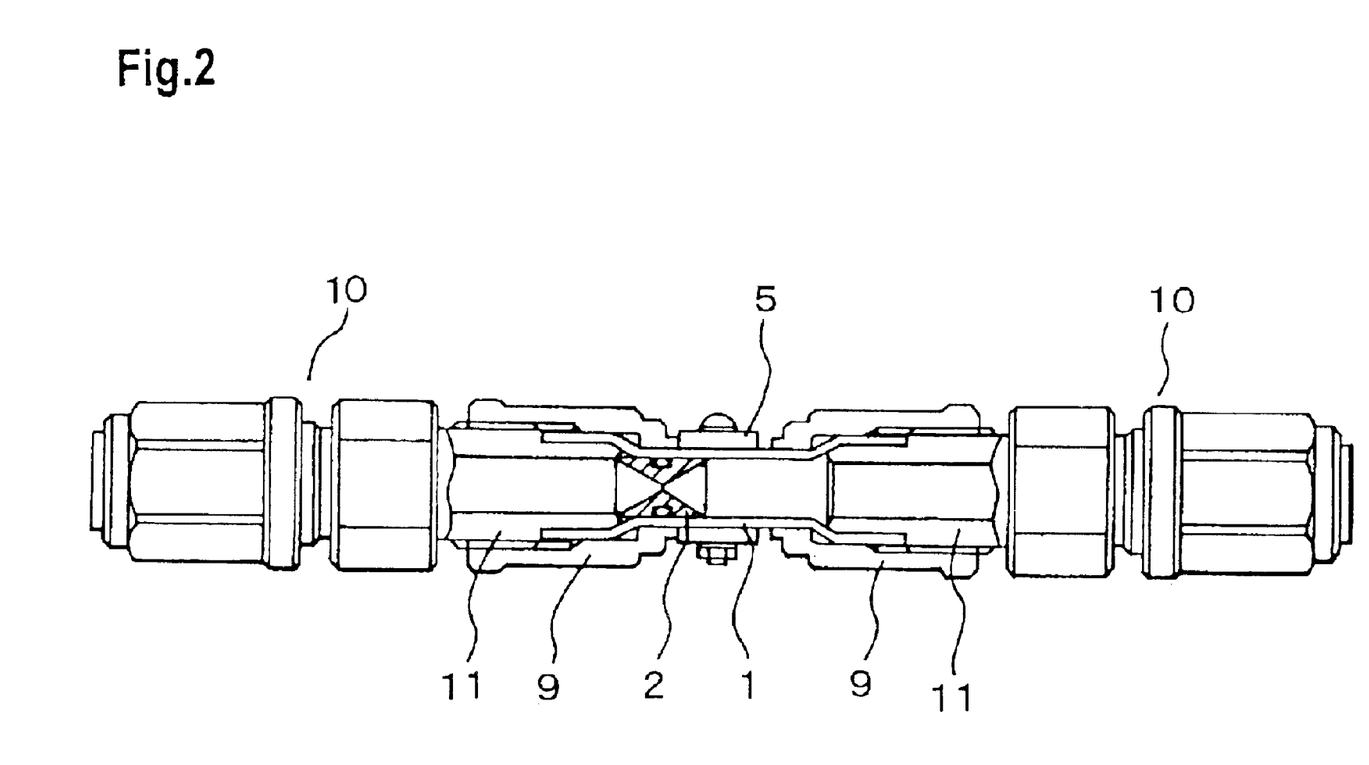
FIG. 2 is a partially broken side view of an essential part of a fluid circuit employing a second embodiment of the replaceable orifice unit of the present invention.

FIG. 2 shows an essential part of a fluid circuit employing a second embodiment of the replaceable orifice unit of the present invention. As is clear from FIG. 2, each of the opposite end portions of the tube member 1 of this second embodiment is firmly clamped in a radial direction of the tube member 1 between an inner peripheral surface of the nut member 9 and an outer peripheral surface of a male screw member 11 which assumes a sleeve-like shape. As a stopper means for preventing the orifice piece 2 from moving inside the tube member 1, the U-shaped clip 5 which has the same construction as that of the clip 5 used in the first embodiment shown in FIG. 1(A) is also employed in this second embodiment. Although not shown in the second embodiment of FIG. 2, it is possible for the second embodiment to employ any suitable means other than those (for example, such as the clip 5 and the like) used in FIGS. 1(B), 1 (C) and 1 (D) in preventing the orifice piece 2 from moving inside the tube member 1 and also in providing a fluid sealing means in the second embodiment.

Figure 3:
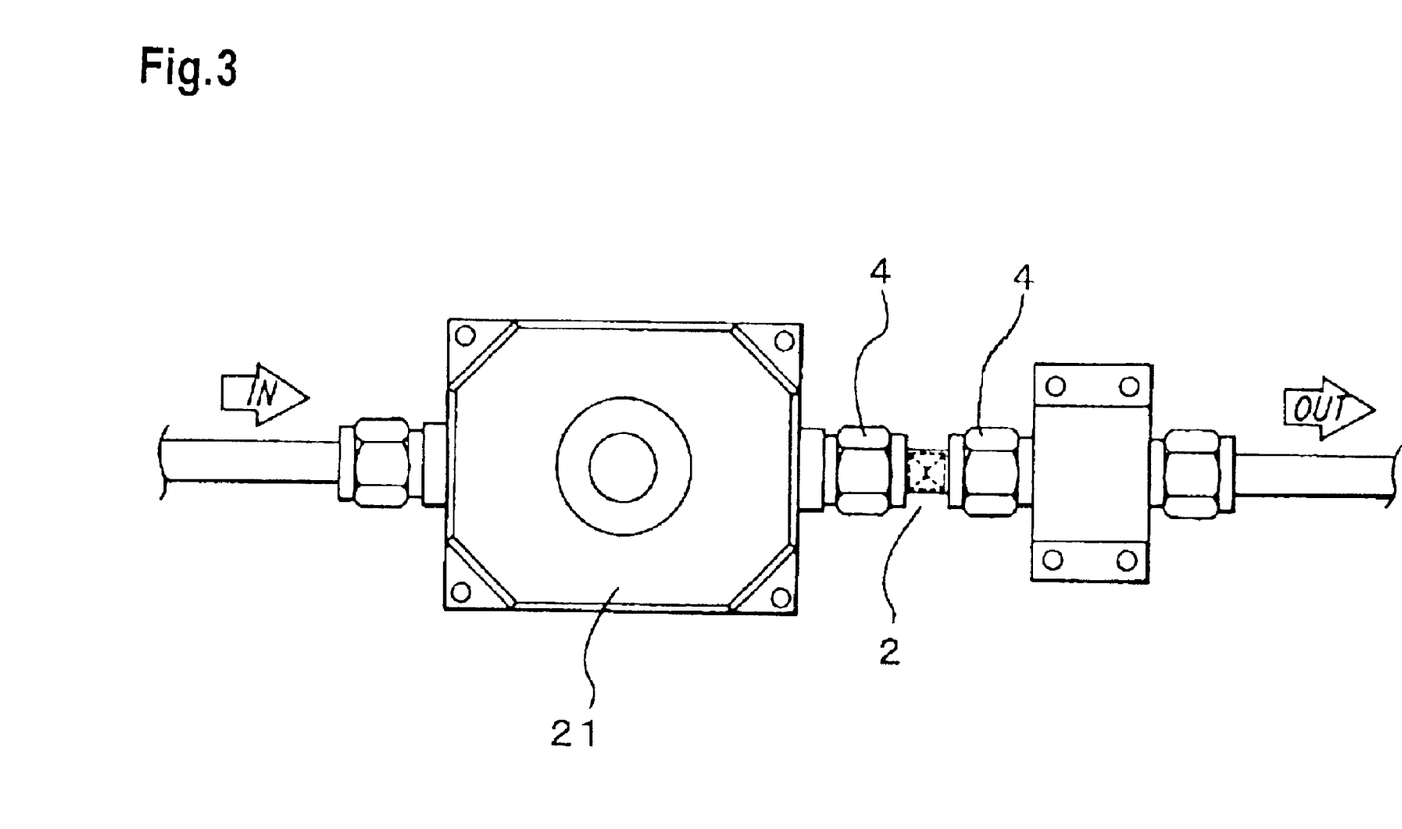
FIG. 3 is a side view of an essential part of the replaceable orifice unit of a third embodiment of the present invention mounted in the fluid circuit.

The replaceable orifice unit of the present invention may have any one of the above various constructions, and used in the fluid circuit employed in the field of semiconductor fabrication, wherein a high purity chemical and like high purity fluid may pass through the fluid circuit capable of being controlled in flow rate of the fluid. More specifically, the replaceable orifice unit of the present invention is disposed in the downstream side of the pressure or the flow regulator valve denoted by the reference numeral 21 in the third embodiment of FIG. 3. As is clear from FIG. 3, the replaceable orifice unit of the present invention is disposed in the downstream side of the regulator valve 21 in the fluid circuit, and has each of its opposite end portions fluid-communicated with the fluid circuit through a coupling unit which may be in the form of either the nut member 4 shown in FIG. 1(A) or the coupling member 10 shown in FIG. 2.

Incidentally, the pressure or the flow regulator valve 21 used in the fluid circuit in which the replaceable orifice unit of the present invention is used may be either of a manually operated type or of an air or pneumatically operated type.

The effects of the present invention will be now described. Since the replaceable orifice unit of the present invention has a construction in which the orifice piece 2 is incorporated in the tube member 1, it is possible to eliminate the extra tube members and like components both inherent in the conventional replaceable orifice unit. This makes it possible to produce the replaceable orifice unit of the present invention using the smallest possible number of components. Due to this, the replaceable orifice unit of the present invention is compact in construction, and sufficient low in manufacturing cost. Further, in the third modification (shown in FIG. 1(D)) of the first embodiment, it is possible to produce the replaceable orifice unit of the present invention by simply adding the orifice piece 2 to the tube member 1. Due to this simplicity, the replaceable orifice unit of the present invention may enjoy a further reduction in manufacturing cost.

In the art of semiconductor fabrication, a tube member is inherently required in the fluid circuit. On the other hand, the replaceable orifice unit of the present invention comprises such a tube member as its essential component. Due to this fact, the replaceable orifice unit of the present invention is capable of saving space as is in the conventional incorporated-type orifice unit, without suffering from the maintenance problems inherent in this conventional incorporated-type orifice unit.

What is claimed is:

1. A replaceable orifice unit constructed of a tube member (1), wherein an orifice piece (2) is fixedly mounted inside said tube member (1); and, each of opposite end portions of said tube member (1) has a coupling construction;

wherein said orifice piece (2) assumes two similar triangular shapes in longitudinal cross section, each of which triangular shapes has its vertex oppositely disposed from each other with respect to a longitudinal axis of said tube member (1) to define an orifice (2a) between said vertexes of said triangular shapes, through which orifice (2a) a fluid in a fluid circuit is adapted to pass;

wherein an O-ring is interposed between an inner peripheral wall of said tube member (1) and an outer peripheral surface of said orifice piece (2) to prevent the fluid of said fluid circuit from passing through between said inner peripheral wall of said tube member (1) and said outer peripheral surface of said orifice piece (2).

2. The replaceable orifice unit as set forth in claim 1, wherein said orifice piece (2) is firmly clamped from outside said tube member (1) through said tube member (1) by fastening a U-shaped clip member (5) disposed outside said tube member (1) to prevent said orifice piece (2) from moving inside said tube member (1).

3. The replaceable orifice unit as set forth in claim 1, wherein a sleeve-like spacer member (6) is inserted inside said tube member (1) to prevent said orifice piece (2) from moving inside said tube member (1).

4. The replaceable orifice unit as set forth in claim 1, wherein at least one annular ridge portion (8) is provided in an outer peripheral surface of said orifice piece (2) to abut against an inner peripheral surface of said tube member (1).

5. The replaceable orifice unit as set forth in claim 1, wherein said orifice (2a) assumes a straight through-hole shape, said through-hole shape being very short in longitudinal length.

6. The replaceable orifice unit as set forth in claim 1, wherein said orifice piece (2) has its opposite axial opening end portions substantially equal in inner diameter to said tube member (1).

7. A replaceable orifice unit constructed of a tube member (1), wherein an orifice piece (2) is fixedly mounted inside said tube member (1); and, each of opposite end portions of said tube member (1) has a coupling construction wherein: said orifice piece (2) assumes two similar triangular shapes in longitudinal cross section, each of which triangular shapes has its vertex oppositely disposed from each other to define an orifice (2a) between said vertexes of said triangular shapes, through which orifice (2a) a fluid in a fluid circuit passes;

wherein an inner peripheral wall of said tube member (1) is welded to an outer peripheral surface of said orifice piece (2) to form an annular welded area (7) between said inner peripheral wall of said tube member (1) and said outer peripheral surface of said orifice piece (2), wherein said annular welded area (7) is capable of preventing the fluid of said fluid circuit from passing through between said inner peripheral wall of said tube member (1) and said outer peripheral surface of said orifice piece (2).

8. The replaceable orifice unit as set forth in claim 7, wherein said orifice (2a) assumes a straight through-hole shape, said through-hole shape being very short in longitudinal length.

9. The replaceable orifice unit as set forth in claim 7, wherein said orifice piece (2) has its opposite axial opening and portions substantially equal in inner diameter to said tube member (1).

10. A replaceable orifice unit constructed of a tube member (1), wherein an orifice piece (2) is fixedly mounted inside said tube member (1); and, each of opposite end portions of said tube member (1) has a coupling construction;

wherein: a ring member (3) is fitted inside each of opposite end portions of said tube member (1); and, each of said opposite end portions of said tube member (1) is engaged with a reduced-diameter portion of a nut member (4) coaxially disposed outside each of said opposite end portions of said tube member (1).

11. A replaceable orifice unit constructed of a tube member (1), wherein an orifice piece (2) is fixedly mounted inside said tube member (1); and, each of opposite end portions of said tube member (1) has a coupling construction;

wherein at least one annular ridge portion (8) is provided in an outer peripheral surface of said orifice piece (2) to abut against an inner peripheral surface of said tube member (1);

wherein: said annular ridge portion (8) is provided in said outer peripheral surface of said orifice piece (2); said inner peripheral surface of said tube member (1) is welded to said outer peripheral surface of said orifice piece (2); whereby said fluid in said fluid circuit is prevented from passing through between said inner peripheral surface of said tube member (1) and said outer peripheral surface of said orifice piece (2).

12. The replaceable orifice unit as set forth in claim 11, wherein said annular ridge portion (8) of said orifice piece (2) is disposed adjacent to said annular welded portion (7) formed between said inner peripheral surface of said tube member (1) and said outer peripheral surface of said orifice piece (2).

13. A replaceable orifice unit constructed of a tube member (1), wherein an orifice piece (2) is fixedly mounted inside said tube member (1); and, each of opposite end portions of said tube member (1) has a coupling construction;

wherein said longitudinal orifice piece (2) assumes a pair of triangular shapes in longitudinal cross section, said triangular shapes being in facing relationship such that each triangular shape has its vertex oppositely disposed from each other with respect to a longitudinal axis of said tube member (1) to define an orifice (2a) between said vertexes of said triangular shapes, through which orifice (2a) a fluid in a fluid circuit is adapted to pass;

wherein an O-ring is interposed between an inner peripheral wall of said tube member (1) and an outer peripheral surface of said orifice piece (2) to prevent the fluid of said fluid circuit from passing through between said inner peripheral wall of said tube member (1) and said outer peripheral surface of said orifice piece (2).

14. A replaceable orifice unit constructed of a tube member (1), wherein an orifice piece (2) is fixedly mounted inside said tube member (1); and, each of opposite end portions of said tube member (1) has a coupling construction wherein said longitudinal orifice piece (2) assumes a pair of triangular shapes in longitudinal cross section, said triangular shapes being in facing relationship such that each triangular shape has its vertex oppositely disposed from each other with respect to a longitudinal axis of said tube member (1) to define an orifice (2a) between said vertexes of said triangular shapes, through which orifice (2a) a fluid in a fluid circuit passes;

wherein an inner peripheral wall of said tube member (1) is welded to an outer peripheral surface of said orifice piece (2) to form an annular welded area (7) between said inner peripheral wall of said tube member (1) and said outer peripheral surface of said orifice piece (2), wherein said annular welded area (7) is capable of preventing the fluid of said fluid circuit from passing through between said inner peripheral wall of said tube member (1) and said outer peripheral surface of said orifice piece (2).

* * * * *